United States Patent
Maatta

(10) Patent No.: US 9,930,228 B2
(45) Date of Patent: Mar. 27, 2018

(54) RETRACTABLE CAMERA CAP

(71) Applicant: Microsoft Technology Licensing, LLC, Redmond, WA (US)

(72) Inventor: Esa Maatta, Espoo (FI)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 79 days.

(21) Appl. No.: 15/197,361

(22) Filed: Jun. 29, 2016

(65) Prior Publication Data

US 2018/0007242 A1 Jan. 4, 2018

(51) Int. Cl.
*H04N 5/225* (2006.01)
*G06K 9/00* (2006.01)
*G06F 3/0488* (2013.01)

(52) U.S. Cl.
CPC ......... *H04N 5/2252* (2013.01); *G06F 3/0488* (2013.01); *G06K 9/00006* (2013.01); *H04N 5/2254* (2013.01)

(58) Field of Classification Search
CPC .. H04N 5/2252; H04N 5/2254; G06F 3/0488; G06F 1/1616; G06F 1/1686; G06F 1/169; G06F 1/1692
See application file for complete search history.

(56) References Cited

U.S. PATENT DOCUMENTS

| | | | |
|---|---|---|---|
| 5,864,334 A | 1/1999 | Sellers | |
| 6,731,956 B2 | 5/2004 | Hanna et al. | |
| 7,058,433 B2 | 6/2006 | Carpenter | |
| 7,139,473 B2 | 11/2006 | Shimano et al. | |
| 7,269,443 B2 | 9/2007 | Park et al. | |
| 7,362,373 B2 | 4/2008 | Tsai | |
| 8,098,319 B2 | 1/2012 | Demuynck | |
| 8,400,564 B2 | 3/2013 | Jacobs | |
| 2005/0101348 A1 | 5/2005 | Wang | |
| 2006/0142053 A1 | 6/2006 | Garcia et al. | |
| 2006/0217148 A1 | 9/2006 | Cok | |

(Continued)

FOREIGN PATENT DOCUMENTS

| | | |
|---|---|---|
| CN | 1740901 A | 3/2006 |
| EP | 1667409 A1 | 6/2006 |

OTHER PUBLICATIONS

"International Search Report and Written Opinion Issued in PCT Application No. PCT/US2017/037100", dated Aug. 10, 2017, 11 Pages.

(Continued)

*Primary Examiner* — Antoinette Spinks
(74) *Attorney, Agent, or Firm* — Alleman Hall Creasman & Tuttle LLP

(57) ABSTRACT

Examples of electronic devices are disclosed. An example electronic device includes a first housing including a first inner face, a second housing including a second inner face, and a hinge pivotably connecting the first housing to the second housing for rotation between at least a folded configuration and an open configuration, wherein the first inner face is adjacent the second inner face in the folded configuration. The example electronic device further includes a camera extending from the first inner face, and a cap on the second inner face and in alignment with the camera in the folded configuration, the cap configured to retract from the second inner face in the folded configuration to accommodate extension of the camera from the first inner face.

20 Claims, 5 Drawing Sheets

(56) References Cited

U.S. PATENT DOCUMENTS

2009/0059043 A1  3/2009  Demuynck
2010/0178959 A1  7/2010  Fish
2012/0112031 A1  5/2012  Gormick et al.
2013/0076964 A1  3/2013  Sirpal et al.
2013/0263252 A1  10/2013  Lien et al.
2014/0106822 A1  4/2014  Smith et al.
2014/0140587 A1  5/2014  Ballard et al.

OTHER PUBLICATIONS

Pierce, D., "Sony Tablet P review," The Verge Website, Available Online at http://www.theverge.com/2012/3/6/2847197/sony-tablet-p-review, Mar. 6, 2012, 8 pages.

Sorrel, Charlie., "Retractable Lens Cap for the Olympus XZ1", Published on: May 12, 2011 Available at: http://www.wired.com/2011/05/72-retractable-lens-cap-for-the-olympus-xz1/.

RETRACTABLE CAMERA CAP

BACKGROUND

Handheld electronic devices with integrated cameras are ubiquitous in the consumer market. Driven by user-comfort and aesthetic considerations, very thin handheld devices are increasingly desirable. Engineering extreme thinness in a camera may be challenging, however, as the focal length of the objective lens system of the camera imposes a lower limit on the thickness.

SUMMARY

As a result of decreasing thickness in handheld devices, an integrated camera may extend outside of the housing of the device. Such protrusions may pose additional challenges in foldable devices. The present disclosure provides example electronic devices that accommodate camera protrusions. An example electronic device includes a first housing including a first inner face, a second housing including a second inner face, and a hinge pivotably connecting the first housing to the second housing for rotation between at least a folded configuration and an open configuration, wherein the first inner face is adjacent the second inner face in the folded configuration. The example electronic device further includes a camera extending from the first inner face, and a cap on the second inner face and in alignment with the camera in the folded configuration. The cap is configured to retract from the second inner face in the folded configuration to accommodate extension of the camera from the first inner face.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1A:
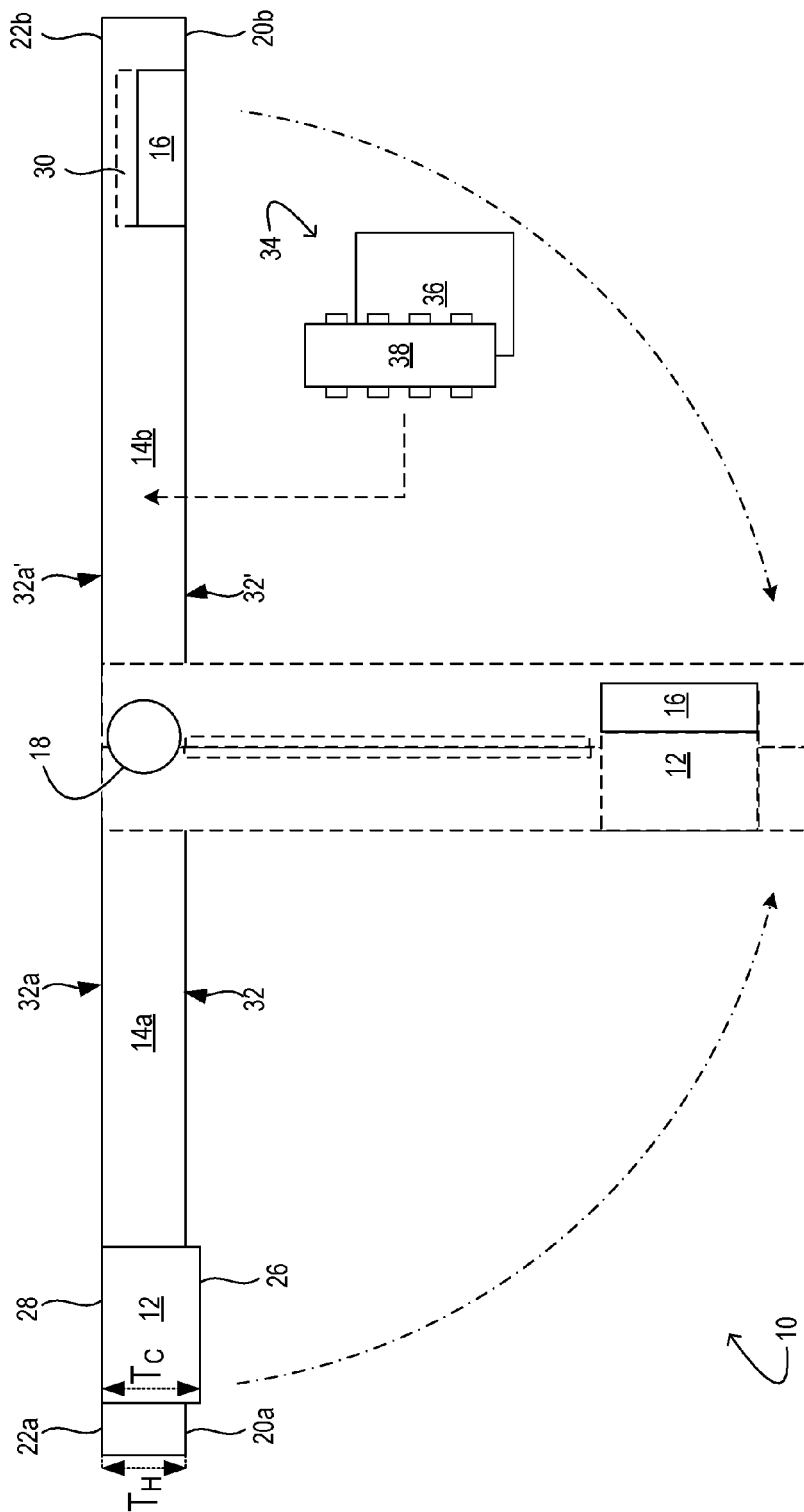
FIGS. 1A, 1B, 1C, and 1D show aspects of an example handheld electronic device.

Aspects of this disclosure will now be described by example and with reference to the drawing figures listed above. Components, process steps, and other elements that may be substantially the same in one or more embodiments are identified coordinately and described with minimal repetition. It will be noted, however, that elements identified coordinately may also differ to some degree. It will be further noted that the drawing figures are schematic and generally not drawn to scale. Unless otherwise noted, the various drawing scales, aspect ratios, and numbers of components shown in the figures may be purposely distorted to make certain features or relationships easier to see.

FIG. 1A shows aspects of an example handheld electronic device 10. The handheld device of FIG. 1 includes a camera 12 disposed in a first, camera-side housing 14a, and a retractable cap 16 disposed in a second, cap-side housing 14b. A retaining member 18 connects the two housings. The handheld device may be embodied as a smartphone, tablet, or laptop computer system, for example. Handheld device 10 is configured to be transitionable, e.g., manually, between an unfolded or open state/configuration (drawn in solid lines) and a folded or closed state/configuration (drawn in broken lines). For example, the retaining member 18 may include a hinge or other mechanical structure enabling the two housings to be pivoted relative to one another between the open and folded states. The handheld device may be usable in both states, while some features of the device may be available only in one state or in the other.

Continuing in FIG. 1A, the camera 12 is coupled via the camera-side housing 14a to components on one side of retaining member 18; the retractable cap 16 is coupled via the cap-side housing 14b to components on the opposite side of the retaining member. As illustrated, the camera 12 may have a thickness $T_C$ that is thicker than the thickness $T_H$ of the camera-side housing 14a. For example, the camera 12 may be 6 to 10 millimeters in thickness, while the housing may be thinner (e.g., 1 to 5 millimeters in thickness). In other examples, the camera 12 may be otherwise positioned such that the camera protrudes from a surface of the housing. For example, each housing may have a respective inner face 20a/b and a respective outer face 22a/b that extends along a longitudinal axis of the housing. The camera 12 may have a thickness that is equal to or less than the thickness of the housing in some examples, yet be spaced from outer face 22a such that the camera still extends from inner face 20a.

Although illustrated as protruding or otherwise extending from inner face 20a, in other examples, the camera 12 may extend from outer face 22a and retractable cap may be positioned so as to be retractable from the outer face 22b. In such examples, the handheld device 10 may be configured to fold in an opposite direction via retaining member 18 relative to the illustrated folding operation. In still other examples, the handheld device 10 may be configured to pivot in both directions, such that the electronic device may be folded to the illustrated folded position (e.g., where the inner faces 20a and 20b come into contact with one another) and to an opposite folded position (e.g., where the outer faces 22a and 22b come into contact with one another). In some examples, two or more cameras may be included in the handheld device 10. Each camera may be positioned in either housing according to any of the above example configurations.

Camera 12 of handheld device 10 is not particularly limited with respect to function; it may be a digital color camera, a night-vision camera, a video camera, a depth-imaging camera, etc. The camera may include an optical side 26, which extends from the inner face 20a and includes optical components (e.g., one or more lenses, a protective window, and/or other optics) and a sensor side 28 which includes a sensor for detecting image light that passes through the optical components. The optical side is configured to collect light from a photographic subject. The sensor side is configured to capture an image of the subject using light collected by the objective portion. In the embodiment of FIG. 1A, handheld device 10 is primarily usable as a camera only while not in the folded state, as the optical side is covered by the cap 16 in the folded state.

The retractable cap 16 is configured to be retracted within a recess 30 of second housing 14b. For example, in the illustrated example, the retractable cap 16 is flush with the inner face 20b in the open configuration, and retracted into the second housing 14b in the closed configuration. By retracting into the second housing, the recess may accommodate the portion of the camera 12 that extends from the inner face 20a of the first housing 14a. In this way, the two housings may lay flat against each other in the folded configuration, decreasing the overall thickness of the handheld device 10 and protecting the optical components of camera 12.

In the embodiment of FIG. 1A, at least one display panel (display panel 32, 32', for example) is coupled to each of camera-side housing 14a and cap-side housing 14b. Each display panel may be an organic light-emitting diode (OLED) or liquid-crystal display (LCD) panel, as non-limiting examples. In some examples, one or more of the display panels may support a resistive or capacitive touch screen. The display panel(s) may be continuous across both housings and/or may be separated by the retaining member 18 (e.g., creating at least one display on each housing). The position of the display panel 32, 32' (e.g., positioned at or on inner faces 20a and 20b) may correspond to examples where the camera 12 is a front-facing camera. The position of display panel 32a, 32a'(e.g., positioned at or on outer faces 22a and 22b) may correspond to examples where the camera 12 is a rear-facing camera.

Handheld device 10 may also include a flash and/or other hardware components not shown in FIG. 1A—cellular, WiFi, and Bluetooth radios, a global-positioning system (GPS) receiver, an inertial-measurement unit, for example. The various hardware components of the handheld device are operatively coupled to computer 34, which includes a logic machine 36 and an associated electronic memory machine 38. The electronic memory machine may hold instructions that cause the logic machine to execute the various computing actions and processes disclosed herein.

Continuing in FIG. 1A, retaining member 18 of handheld device 10 ensures that camera 12 and retractable cap 16 are aligned (such that camera is able to be inserted into the recess 30 while the cap 16 is retracted).

Figure 1B:
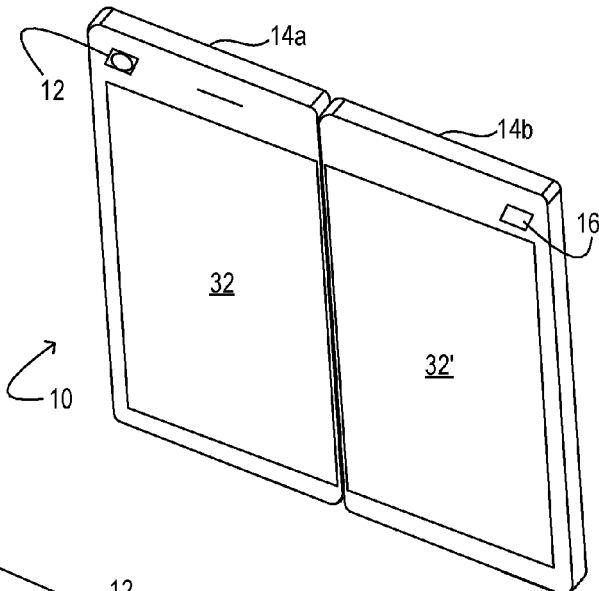
Figure 1C:
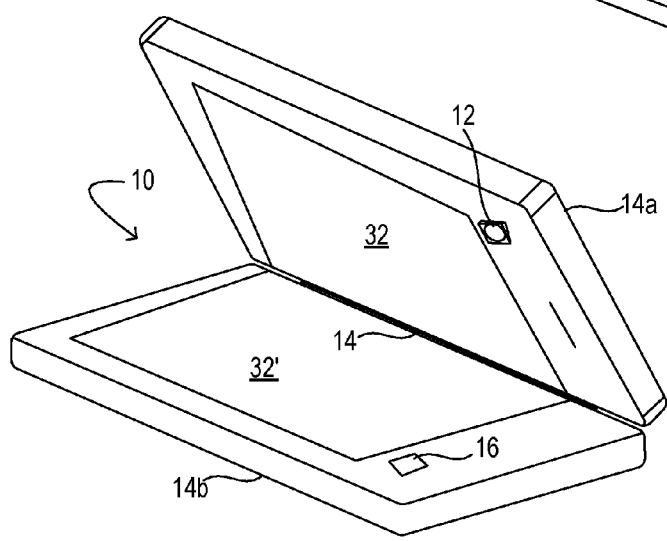
Figure 1D:
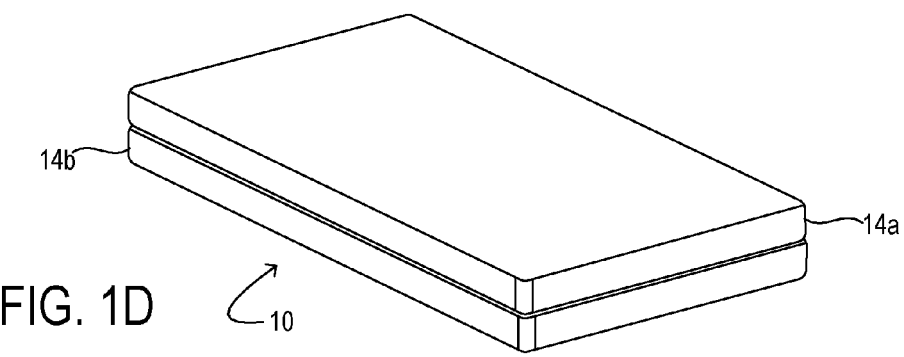

In the embodiment of FIG. 1A, the retaining member 18 includes a hinge. Hinged transitioning between folded and unfolded states of the handheld device is further illustrated in the perspective drawings of FIGS. 1B, 1C, and 1D. FIG. 1B shows the handheld device in the unfolded state. FIG. 1D shows the handheld device in the folded state, where the housings 14a and 14b may lay flat against one another as regions of the camera 12 that extend outside of housing 14a (e.g., past the inner surface of the housing) press retractable cap 16 inward into the recess. FIG. 1C shows the handheld device in a partially folded state.

The placement of the camera 12 and the cap 16 relative to the handheld device 10 illustrated in FIGS. 1A-1D is exemplary in nature. The camera and the cap may be positioned in any suitable location relative to the handheld device as long as the positions relative to one another are maintained (e.g., such that the camera and cap are aligned in the folded configuration). For example, the camera and cap may be positioned closer to the hinged area between the two housings and/or may be positioned on opposite housings relative to the illustrated example (e.g., the camera 12 may be positioned in the location of the cap 16, and the cap 16 may be positioned in the location of the camera 12). Despite the benefits that a folding handheld device offers, other retractable cap geometries are also envisaged. In these and other embodiments, the handheld device may include a mechanical or magnetic latch (not shown in the drawings) to discourage separation of the camera and cap when aligned.

Figure 2:
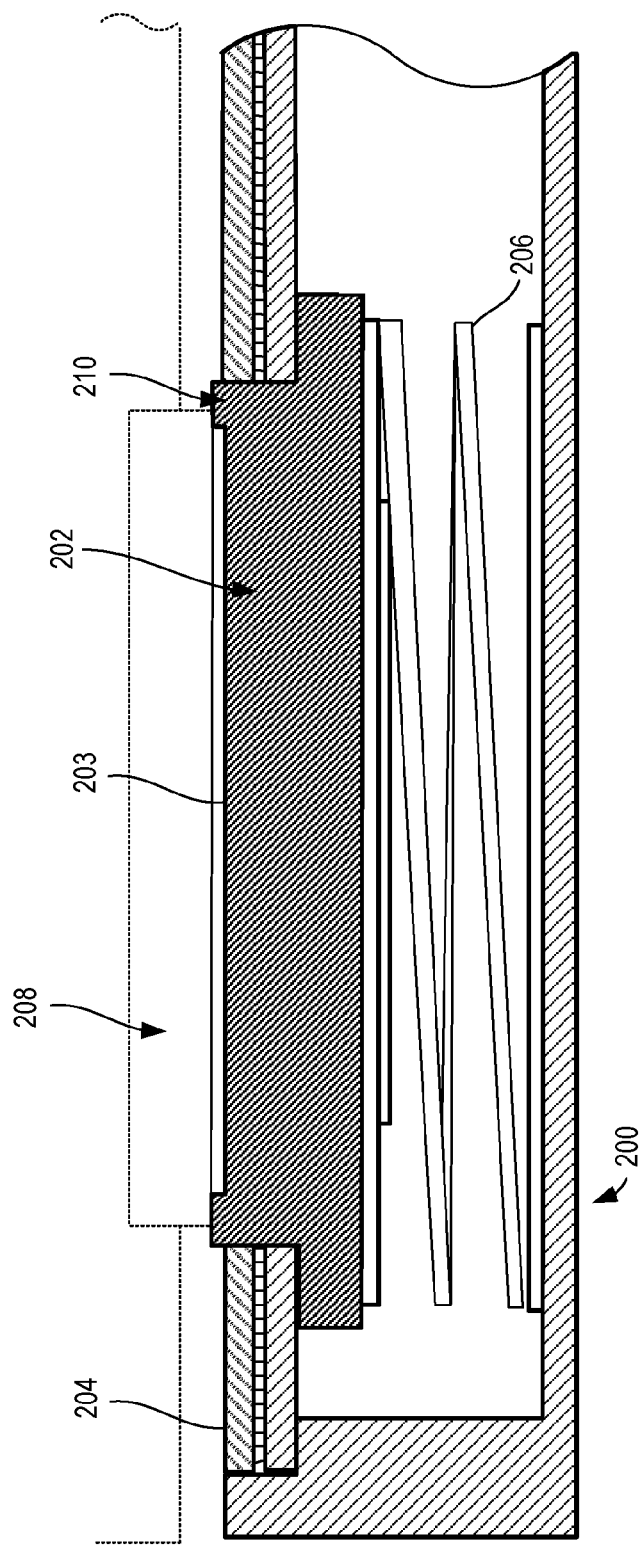
FIG. 2 shows a cross section of an example housing and retractable cap of an example handheld electronic device.

FIG. 2 schematically shows a cross-sectional view of an example housing 200 of an electronic device including a retractable cap 202. The retractable cap may be biased to a home position (e.g., a position where a top surface 203 of the cap is substantially flush with an inner face 204 of the housing 200) by a biasing force. In the illustrated example, the biasing force is provided via a coil spring 206. However, in other examples, the biasing force may be provided by any suitable structure, including a magnet, resilient metal clip spring, compressible material, and/or other biasing features. An external force may cause the retractable cap 202 to be retracted into an interior of the housing 200. As shown, the retractable cap may include a protrusion 210 around a periphery of the cap that is raised relative to top surface 203. In this way, the top surface 203 may be spaced from the camera module 208 and/or other object exerting force on the cap to move the cap away from the biased position. Such spacing may protect the top surface 203 from marks, scratches, or other damages caused by contact with the camera module or other object.

Figure 3:
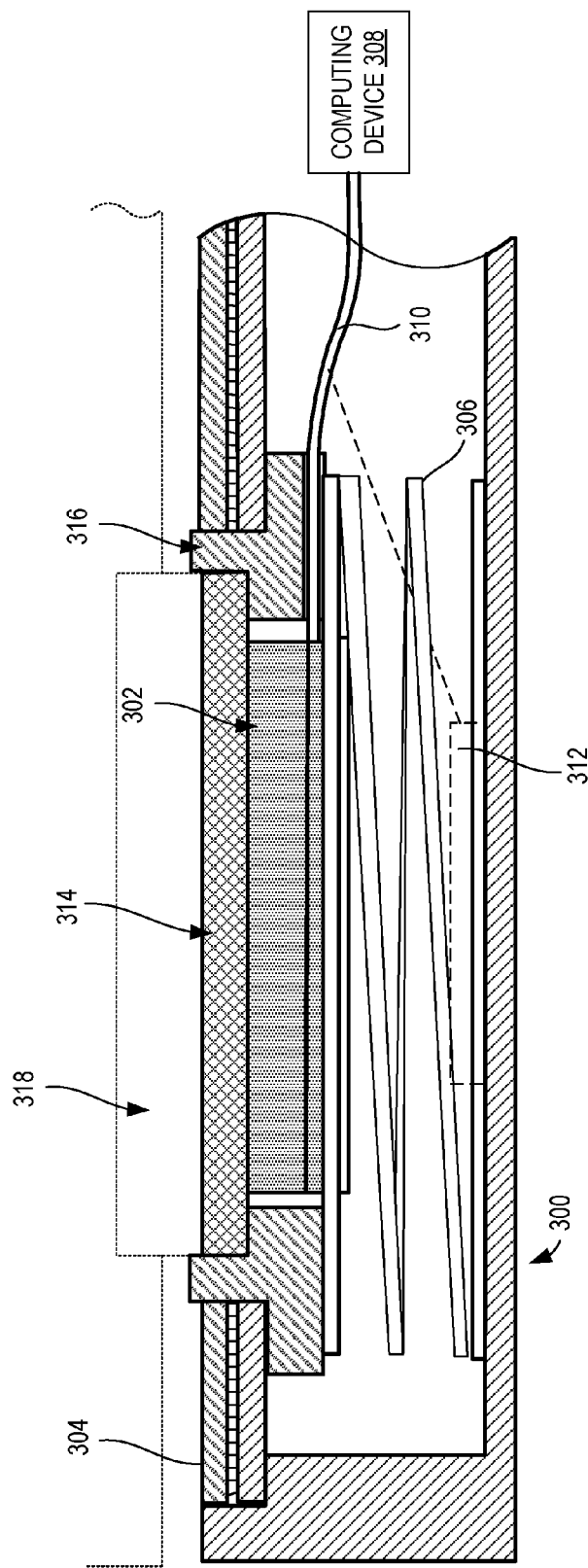
FIG. 3 shows a cross section of another example housing and retractable cap of an example handheld electronic device.

The cap and associated elements may provide additional functionality aside from receiving the protruding regions of the camera when the handheld device is in a folded configuration. FIG. 3 schematically shows a cross-sectional view of an example housing 300 of an electronic device including a retractable cap 302. The retractable cap may be biased to a home position (e.g., a position that is substantially flush with an inner face 304 of the housing 300) by a biasing force. In the illustrated example, the biasing force is provided via a coil spring 306. However, in other examples, the biasing force may be provided by any suitable structure, including a magnet, resilient metal clip spring, compressible material, and/or other biasing features. The position of the retractable cap may control an associated function of the electronic device. The position of the retractable cap may be measured by any suitable technology, such as a Hall Effect sensor and magnet positioned within the housing 300. For example, one of the sensor and the magnet may be incorporated in and/or mounted to a moveable portion of the retractable cap 302. The other of the sensor and magnet may be positioned such that the magnet is within range of the sensor in at least one position of the cap.

The retractable cap 302 may be coupled to a computing device 308 (e.g., computer 34 of FIG. 1A) via an electrical connection 310. In some examples, an indication of the position of the retractable cap 302 (e.g., based on measurements from the Hall Effect sensor) may be transmitted to the computing device 308 via electrical connection 310. The position of the retractable cap 302 may be used as input to the computing device 308 to selectively alter operations of the computing device. In additional or alternative examples, the electronic device may include a switch 312 that is actuatable via movement of the retractable cap 302. In the illustrated example, the switch is aligned with the retractable cap, such that the switch is depressed and/or otherwise actuated when the retractable cap is retracted at least partially into an interior of the housing 300. The switch 312 may be coupled to the electrical connection 310 in order to report the state of the switch (e.g., actuated, not actuated, and/or partially actuated) to the computing device 308. Accordingly, the position of the switch and/or the state of the switch may control operation of the computing device.

Figure 4:
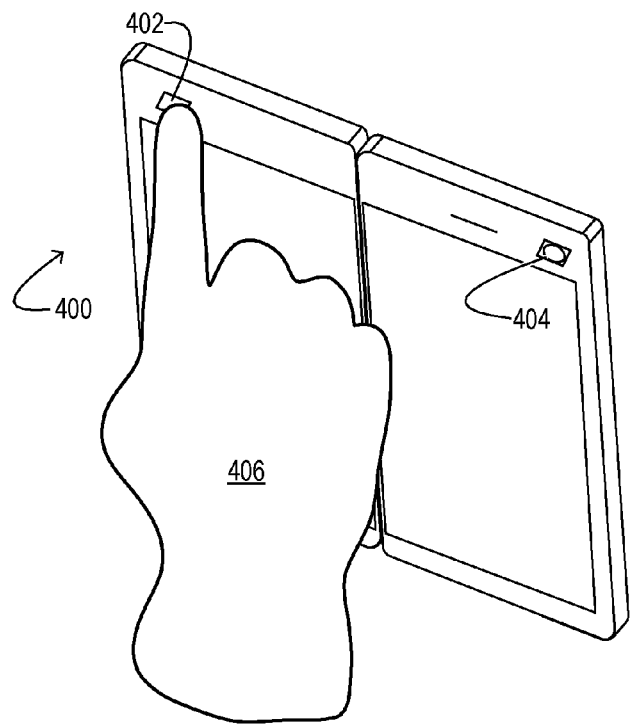
FIG. 4 shows an example of providing input to an example handheld electronic device.

An outward-facing surface of the retractable cap 302 may provide additional functionality to selectively alter operations of the computing device. For example, the outward-facing surface may include a sensor (e.g., a biometric sensor for fingerprinting or optical scanning and/or a touch/hover sensor for touch/hover input detection). Turning briefly to FIG. 4, an example electronic device 400 is illustrated including a retractable cap 402 and a camera 404. A user 406 may provide touch input to the retractable cap 402 in order to perform fingerprint recognition and/or provide touch input to the electronic device.

In additional or alternative examples, other devices may be included in and/or coupled to the retractable cap 302 of FIG. 3. For example, a light source may be coupled to the cap and configured to output light out of a window 314 responsive to actuation of the cap (e.g., to provide flashlight functionality and/or to provide a flash for the camera of the device). As another example, a display may be coupled to and/or integrated in the cap (e.g., to emit display light out of the window 314). The display may output an image or animation relating to a current functionality of the retractable cap, as described below, an image or animation relating to a state of the device, an image/animation selected by a user, and/or any other suitable image or animation. The window 314 may protect the outward-facing surface while allowing the sensor to detect touch/hover input and/or the optional display or other light to be viewed. In additional or alternative examples, the window 314 may include and/or be integrated with the display and/or sensor. The above-described examples are not intended to be limiting, and the retractable cap 302 may provide any suitable functionality including controlling the computing device 308 and/or an associated computing device.

Example functionality provided by the retractable cap and/or switch may include issuing commands to perform operations such as changing an active application and/or launching an application on the computing device, navigating to a selected user interface location (e.g., a home screen), operating a function of a camera of the device (e.g., controlling a shutter of the camera to capture a picture, focusing the camera, and/or zooming the camera), changing a power state of the device (e.g., turning on/off a display, entering/waking from a sleep mode, and/or entering/waking from a hibernate mode), and/or otherwise providing analog and/or digital (e.g., binary) control functions to the device. In some examples, the controls may be combined (e.g., the position of the retractable cap is used to control analog zoom and/or focus and activation of the switch is used to capture a picture). The functionality of the retractable cap may be changed based on a state of the device, a user of the device, and/or a user selection. For example, the actuation of the retractable cap to a fully depressed/retracted position may provide different control instructions based on whether the device is in an open or folded configuration.

In examples where the retractable cap includes and/or is coupled to a display, the display may indicate a current functionality of the retractable cap (e.g., a currently-selected type of input able to be provided with the cap). For example, the display may display a camera icon when the retractable cap is actuatable to provide camera functionality and an application icon when the retractable cap is actuatable to launch and/or switch focus to an application. Sensed data from the optional input sensor may be transmitted to the computing device 308 via electrical connection 310 in order to control the computing device (e.g., biometric data for authorizing a user to access or use the device and/or touch/hover data to interact with a user interface). Display data may be transmitted from the computing device 308 to the optional display of the retractable cap 302 via the electrical connection 310 in order to control the content presented via the display.

Continuing with FIG. 3, a seal 316 is illustrated as being disposed around a periphery of the retractable cap 302. The seal may extend outward (e.g., away from an interior of the housing 300) further than the retractable cap (e.g., and the window 314) in order to provide a tight seal around a camera that may come into alignment with the retractable cap when the electronic device is in a folded configuration (an example of which is shown in FIG. 1A). The seal may prevent debris/moisture from accessing the camera in such an example, and may provide at least some retention forces to maintain the camera within the housing 300. An example position of a camera of a foldable device in a partially folded configuration is shown at 318.

The above-described examples enable a foldable device to incorporate a camera without sacrificing quality for thinness. Any extra thickness of the camera relative to a housing in which the camera is located may be accommodated by a recess and a retractable cap. Active features of the retractable cap (e.g., actuatable controls) provide additional functionality for the electronic device when the cap is not in contact with the camera.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
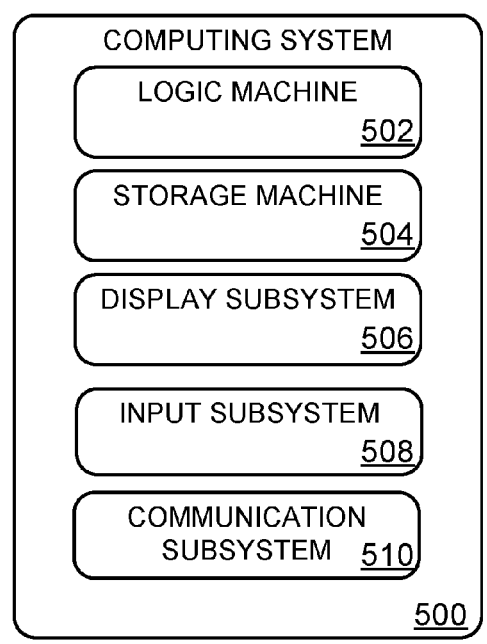
FIG. 5 schematically shows a computing system.

FIG. 5 schematically shows a non-limiting embodiment of a computing system 500 that can enact one or more of the methods and processes described above and/or embody one or more of the systems described above. Computing system 500 is shown in simplified form. Computing system 500 may take the form of one or more mobile communication devices (e.g., smart phone), mobile computing devices, tablet computers, gaming devices, personal computers, server computers, home-entertainment computers, network computing devices, and/or other computing devices. For example, one or more components of electronic device 10 of FIGS. 1A-1D (e.g., computer 34) may include and/or be included in one or more components of computing system 500.

Computing system 500 includes a logic machine 502 and a storage machine 504. Computing system 500 may optionally include a display subsystem 506, input subsystem 508, communication subsystem 510, and/or other components not shown in FIG. 5.

Logic machine 502 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 504 includes one or more physical devices configured to hold instructions executable by the logic machine to implement the methods and processes described herein. When such methods and processes are implemented, the state of storage machine 504 may be transformed—e.g., to hold different data.

Storage machine 504 may include removable and/or built-in devices. Storage machine 504 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 504 may include volatile, non-volatile, dynamic, static, read/write, read-only, random-access, sequential-access, location-addressable, file-addressable, and/or content-addressable devices.

It will be appreciated that storage machine 504 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 502 and storage machine 504 may be integrated together into one or more hardware-logic components. Such hardware-logic components may include field-programmable gate arrays (FPGAs), program- and application-specific integrated circuits (PASIC/ASICS), program- and application-specific standard products (PSSP/ASSPs), system-on-a-chip (SOC), and complex programmable logic devices (CPLDs), for example.

The terms "module," "program," and "engine" may be used to describe an aspect of computing system 500 implemented to perform a particular function. In some cases, a module, program, or engine may be instantiated via logic machine 502 executing instructions held by storage machine 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 506 may be used to present a visual representation of data held by storage machine 504. This visual representation may take the form of a graphical user interface (GUI). As the herein described methods and processes change the data held by the storage machine, and thus transform the state of the storage machine, the state of display subsystem 506 may likewise be transformed to visually represent changes in the underlying data. Display subsystem 506 may include one or more display devices utilizing virtually any type of technology. Such display devices may be combined with logic machine 502 and/or storage machine 504 in a shared enclosure, or such display devices may be peripheral display devices.

When included, input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 may be configured to communicatively couple computing system 500 with one or more other computing devices. Communication subsystem 510 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

Another example provides for an electronic device including a first housing including a first inner face, a second housing including a second inner face, a hinge pivotably connecting the first housing to the second housing for rotation between at least a folded configuration and an open configuration, wherein the first inner face is adjacent the second inner face in the folded configuration, a camera extending from the first inner face, and a cap on the second inner face and in alignment with the camera in the folded configuration, the cap configured to retract from the second inner face in the folded configuration to accommodate extension of the camera from the first inner face. Such an example may additionally or alternatively include the electronic device, wherein the cap is flush with the second inner face in the open configuration. Such an example may additionally or alternatively include the electronic device, wherein the cap includes a biometric sensor, a sensing surface of the biometric sensor facing the camera in the folded configuration. Such an example may additionally or alternatively include the electronic device, wherein the cap includes an input sensor actuatable to provide input to the electronic device. Such an example may additionally or alternatively include the electronic device, wherein the cap further includes a display. Such an example may additionally or alternatively include the electronic device, wherein the input sensor is configurable to provide different types of input, the display indicating a currently-selected type of input associated with the input sensor. Such an example may additionally or alternatively include the electronic device, wherein the input sensor includes a touch sensor. Such an example may additionally or alternatively include the electronic device, wherein the input sensor includes an actuatable structure that is movable between a plurality of positions. Such an example may additionally or alternatively include the electronic device, further comprising a Hall Effect sensor and magnet configured to detect a position of the actuatable structure. Such an example may additionally or alternatively include the electronic device, further comprising a spring operatively coupled to the cap, the spring being depressed in the folded configuration. Such an example may additionally or alternatively include the electronic device, further comprising a switch operatively coupled to the cap in at least the folded configuration, the switch being actuated in the folded configuration. Such an example may additionally or alternatively include the electronic device, wherein the cap is actuatable to issue one or more of an application launch, a camera zoom, a camera focus, and a camera capture command to the electronic device. Such an example may additionally or alternatively include the electronic device, further comprising a seal disposed around a periphery of the cap. Any or all of the above-described examples may be combined in any suitable manner in various implementations.

Another example provides for an electronic device including a first housing including a first inner face and a first outer face, a second housing including a second inner face and a second outer face, a display including a first portion on the first housing and a second portion on the second housing, a hinge pivotably connecting the first housing to the second housing for rotation between at least a folded configuration and an open configuration, wherein the first inner face is adjacent the second inner face in the folded configuration, a camera extending from the first inner face, and a cap on the second inner face and in alignment with the camera in the folded configuration, the cap configured to retract from the second inner face in the folded configuration to accommodate extension of the camera from the first inner face. Such an example may additionally or alternatively include the electronic device, wherein the cap includes an input sensor actuatable to provide input to the electronic device. Such an example may additionally or alternatively include the electronic device, wherein the input sensor includes a touch sensor. Such an example may additionally or alternatively include the electronic device, wherein the input sensor includes an actuatable structure that is movable between a plurality of positions. Such an example may additionally or alternatively include the electronic device, further comprising a seal disposed around a periphery of the cap. Any or all of the above-described examples may be combined in any suitable manner in various implementations.

Another example provides for an electronic device including a first housing including a first inner face and a first outer face, a second housing including a second inner face and a second outer face, one or more of the first inner face, the second inner face, the first outer face, and the second outer face including a display, a hinge pivotably connecting the first housing to the second housing for rotation between at least a folded configuration and an open configuration, wherein the first inner face is adjacent the second inner face in the folded configuration, a camera extending from the first inner face, and a cap on the second inner face and in alignment with the camera in the folded configuration, the cap configured to retract from the second inner face in the folded configuration to accommodate extension of the camera from the first inner face, and the cap including an input sensor actuatable to provide input to the electronic device. Such an example may additionally or alternatively include the electronic device, wherein the input sensor includes one or more of a touch sensor and an actuatable structure that is movable between a plurality of positions. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An electronic device, comprising:
   a first housing including a first inner face;
   a second housing including a second inner face;
   a hinge pivotably connecting the first housing to the second housing for rotation between at least a folded configuration and an open configuration, wherein the first inner face is adjacent the second inner face in the folded configuration;
   a camera extending from the first inner face; and
   a cap on the second inner face and in alignment with the camera in the folded configuration, the cap configured to retract from the second inner face in the folded configuration to accommodate extension of the camera from the first inner face.

2. The electronic device of claim 1, wherein the cap is flush with the second inner face in the open configuration.

3. The electronic device of claim 1, wherein the cap includes a biometric sensor, a sensing surface of the biometric sensor facing the camera in the folded configuration.

4. The electronic device of claim 1, wherein the cap includes an input sensor actuatable to provide input to the electronic device.

5. The electronic device of claim 4, wherein the cap further includes a display.

6. The electronic device of claim 5, wherein the input sensor is configurable to provide different types of input, the display indicating a currently-selected type of input associated with the input sensor.

7. The electronic device of claim 4, wherein the input sensor includes a touch sensor.

8. The electronic device of claim 4, wherein the input sensor includes an actuatable structure that is movable between a plurality of positions.

9. The electronic device of claim 8, further comprising a Hall Effect sensor and magnet configured to detect a position of the actuatable structure.

10. The electronic device of claim 8, further comprising a spring operatively coupled to the cap, the spring being depressed in the folded configuration.

11. The electronic device of claim 8, further comprising a switch operatively coupled to the cap in at least the folded configuration, the switch being actuated in the folded configuration.

12. The electronic device of claim 4, wherein the cap is actuatable to issue one or more of an application launch, a camera zoom, a camera focus, and a camera capture command to the electronic device.

13. The electronic device of claim 1, further comprising a seal disposed around a periphery of the cap.

14. An electronic device, comprising:
   a first housing including a first inner face and a first outer face;

a second housing including a second inner face and a second outer face;
a display including a first portion on the first housing and a second portion on the second housing;
a hinge pivotably connecting the first housing to the second housing for rotation between at least a folded configuration and an open configuration, wherein the first inner face is adjacent the second inner face in the folded configuration;
a camera extending from the first inner face; and
a cap on the second inner face and in alignment with the camera in the folded configuration, the cap configured to retract from the second inner face in the folded configuration to accommodate extension of the camera from the first inner face.

15. The electronic device of claim 14, wherein the cap includes an input sensor actuatable to provide input to the electronic device.

16. The electronic device of claim 15, wherein the input sensor includes a touch sensor.

17. The electronic device of claim 15, wherein the input sensor includes an actuatable structure that is movable between a plurality of positions.

18. The electronic device of claim 14, further comprising a seal disposed around a periphery of the cap.

19. An electronic device, comprising:
a first housing including a first inner face and a first outer face;
a second housing including a second inner face and a second outer face, one or more of the first inner face, the second inner face, the first outer face, and the second outer face including a display;
a hinge pivotably connecting the first housing to the second housing for rotation between at least a folded configuration and an open configuration, wherein the first inner face is adjacent the second inner face in the folded configuration;
a camera extending from the first inner face; and
a cap on the second inner face and in alignment with the camera in the folded configuration, the cap configured to retract from the second inner face in the folded configuration to accommodate extension of the camera from the first inner face, and the cap including an input sensor actuatable to provide input to the electronic device.

20. The electronic device of claim 19, wherein the input sensor includes one or more of a touch sensor and an actuatable structure that is movable between a plurality of positions.

* * * * *